(12) United States Patent
Yu et al.

(10) Patent No.: US 9,782,004 B2
(45) Date of Patent: Oct. 10, 2017

(54) WALL-MOUNTED DEVICES

(71) Applicant: Shenzhen China Star Optoelectronics Technology Co., Ltd., Shenzhen, Guangdong (CN)

(72) Inventors: Yajun Yu, Guangdong (CN); Chengling Lv, Guangdong (CN); Guofu Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 15/318,972

(22) PCT Filed: Jun. 18, 2014

(86) PCT No.: PCT/CN2014/080241
§ 371 (c)(1),
(2) Date: Dec. 14, 2016

(87) PCT Pub. No.: WO2015/192346
PCT Pub. Date: Dec. 23, 2015

(65) Prior Publication Data
US 2017/0188708 A1    Jul. 6, 2017

(30) Foreign Application Priority Data

Jun. 16, 2014 (CN) .......................... 2014 1 0267648

(51) Int. Cl.
A47F 5/08       (2006.01)
A47B 97/00      (2006.01)
F16M 13/02      (2006.01)

(52) U.S. Cl.
CPC ............ *A47B 97/001* (2013.01); *F16M 13/02* (2013.01); *A47F 5/0838* (2013.01); *A47F 5/0846* (2013.01)

(58) Field of Classification Search
USPC ....... 248/489, 495, 496, 317, 323, 917, 918, 248/919; 211/162, 94.01, 94.02
See application file for complete search history.

(56) References Cited

U.S. PATENT DOCUMENTS 5,224,610 A * 7/1993 Veazey ................. A47F 5/0846
                                                        211/162
8,210,368 B2 * 7/2012 Schwartzkopf ...... A47B 96/061
                                                        211/103
(Continued)

*Primary Examiner* — Alfred Wujciak
(74) *Attorney, Agent, or Firm* — Andrew C. Cheng

(57) ABSTRACT

A wall-mounted device includes a sliding bar connecting to a display panel, a fixed frame being mounted on a wall, and a guiding-track assembly being configured between the sliding bar and the fixing frame. The guiding-track assembly includes a first guiding track and a second guiding track, the first guiding track engages with the sliding bar in a sliding manner, and the second guiding track engages with the fixed frame in the sliding manner, wherein the sliding bar is installed in a pre-configured first direction, and the fixed frame is installed in a pre-configured second direction. With such configuration, the wall-mounted device has configurable locations from multiple orientations. The wall-mounted device has simple structure, and may be operated easily. In addition, after being adjusted, the wall-mounted device may be fixed on the wall via positioning assemblies so as to prevent the display panel from being inadvertently moved.

7 Claims, 2 Drawing Sheets

(56) References Cited

U.S. PATENT DOCUMENTS

| | | | |
|---|---|---|---|
| 8,276,864 B2 * | 10/2012 | Ye | F16M 11/04 |
| | | | 248/287.1 |
| 8,864,095 B1 * | 10/2014 | Marks | A47G 1/16 |
| | | | 248/323 |
| 2007/0056921 A1 * | 3/2007 | Lo | A47B 95/008 |
| | | | 211/94.01 |

* cited by examiner

WALL-MOUNTED DEVICES

BACKGROUND OF THE INVENTION

1. Field of the Invention

The present disclosure relates to mechanical technology, and more particularly to a wall-mounted device having configurable locations from multiple orientations.

2. Discussion of the Related Art

Currently, televisions (TVs) are designed to be lighter and thinner. Not only the visual experience is great, but also the space may be saved. With such design, a better option is to mount the TVs on the wall due to the weight of the TVs. However, some problems may arise, such as:

1. With respect to traditional wall-mounted structure, a fixing frame is fixed on the wall, and the TV is then mounted on the fixing frame. With such configuration, the location of the TV cannot be easily adjusted. Better visual experience cannot be obtained when the location of the sofa and the TV wall are not aligned or when the location of the viewer has been changed.

2. The TV may not be totally embedded within the wall due to the heavy weight and thickness of the traditional wall-mounted structure.

3. Conventionally, the relative location of the TVs and the wall-mounted structure are configured in advance, and then the wall-mounted structure is fixed on the wall. Afterward, the TV is mounted. Users may not be able to adjust the relative location of the TV and the wall-mounted structure.

In regard to such conventional wall-mounted structure, only the location along the horizontal direction may be configured, which results in limitations. It can be understood that such wall-mounted structure not only can install computers, but also the flat display panels.

SUMMARY

The present disclosure relates to a wall-mounted device having configurable locations from multiple orientations.

In one aspect, a wall-mounted device includes: a sliding bar connecting to a display panel, a fixed frame being mounted on a wall, and a guiding-track assembly being configured between the sliding bar and the fixing frame, the guiding-track assembly comprises a first guiding track and a second guiding track, the first guiding track engages with the sliding bar in a sliding manner, and the second guiding track engages with the fixed frame in the sliding manner, wherein the sliding bar is installed in a pre-configured first direction, and the fixed frame is installed in a pre-configured second direction.

Wherein the first direction is a horizontal direction, and the second direction is a vertical direction perpendicular to the first direction.

Wherein two lateral sides of the sliding bar are configured with a first groove, and a cross section of the sliding bar is "I-beam"-shaped.

Wherein the guiding-track assembly comprises a bar-shaped body, side plates integrally connecting to two lateral sides of the bar-shaped body, and the first guiding track, wherein end portions of the first guiding track extends toward one other, the first guiding track inserts into the first groove of the sliding bar from two lateral sides of the sliding bar so as to slide with respect to the sliding bar, and the second guiding track is integrally connected to a back side of the bar-shaped body.

Wherein a first positioning hole is configured on one of the side plates located on an up portion of the guiding-track assembly, and the first positioning hole connects to threads of a positioning screw.

Wherein two lateral sides of the sliding bar are configured with a second groove, a cross section of the second groove bar is "I-beam"-shaped, and a direction of the second groove is perpendicular to the direction of the first groove of the sliding bar.

Wherein the fixed frame comprises a bar-shaped body, side plates integrally connected with two lateral sides of the bar-shaped body, and a third guiding track having end portions extend toward one another, the third guiding track are inserted into the second groove of the guiding-track assembly from two lateral sides so as to slide relatively to the guiding-track assembly.

Wherein a second positioning hole is configured on the side plates of the fixing frame, and the second positioning hole connects to threads of the positioning screw.

Wherein a plurality of positioning grooves are configured on the second guiding track of the guiding-track assembly, and the positioning grooves correspond to the positioning holes.

With such configuration, the wall-mounted device has configurable locations from multiple orientations. The wall-mounted device has simple structure, and may be operated easily. In addition, after being adjusted, the wall-mounted device may be fixed on the wall via positioning assemblies so as to prevent the display panel from being inadvertently moved.

DETAILED DESCRIPTION OF THE EMBODIMENTS

Embodiments of the invention will now be described more fully hereinafter with reference to the accompanying drawings, in which embodiments of the invention are shown.

Figure 1:
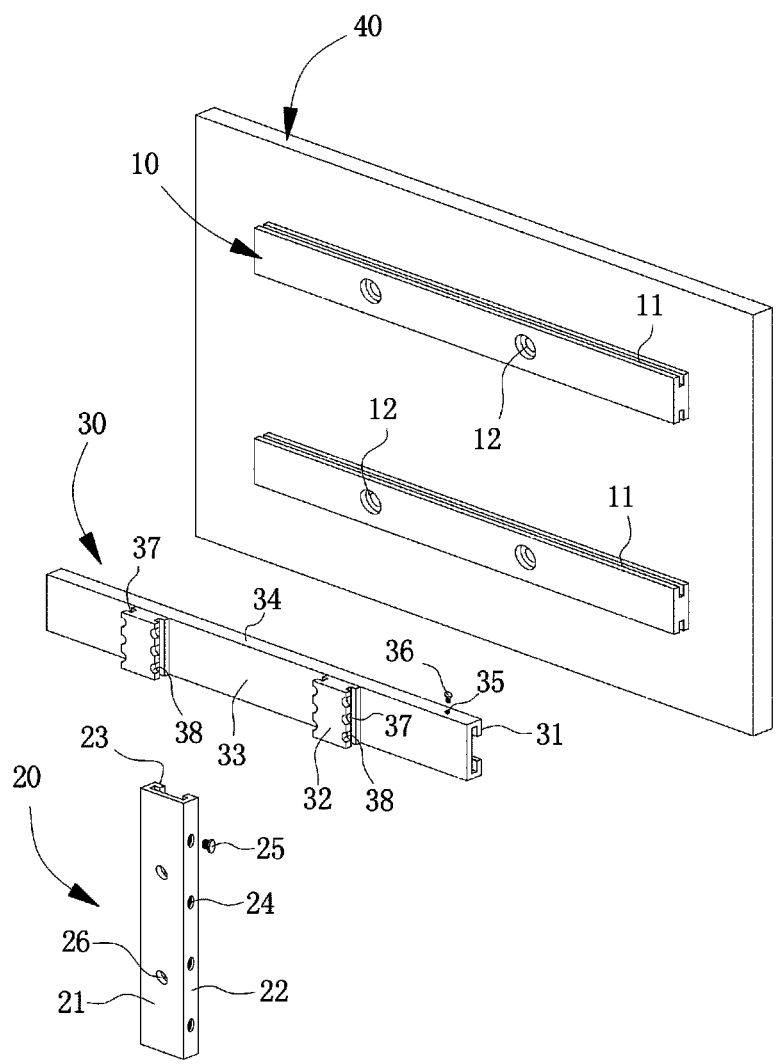
FIG. 1 is an exploded view of the wall-mounted device in accordance with one embodiment.
Figure 2:
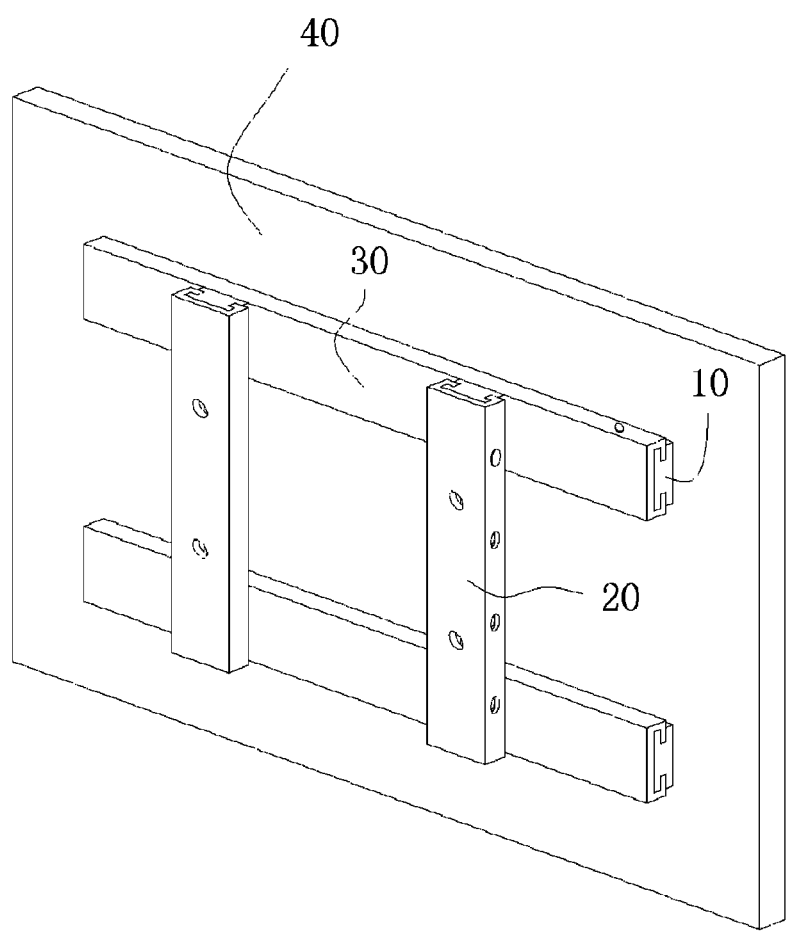
FIG. 2 is an assembled view of the wall-mounted device in accordance with one embodiment.

As shown in FIGS. 1 and 2, the wall-mounted device includes a sliding bar 10, a fixed frame 20, and a guiding-track assembly 30, wherein the sliding bar 10 connects to a display panel. In an example, the display panel may be a flat TV 40. The fixed frame 20 is fixed on the wall, and the guiding-track assembly 30 respectively connects to the sliding bar 10 and the fixed frame 20. FIG. 2 is an assembled view of the wall-mounted device in accordance with one embodiment, and the structures of the components and the connection between the components will be described hereinafter.

As shown, the sliding bar 10 is bar-shaped, and two lateral sides of the sliding bar 10 are respectively configured with a first groove 11. The cross-section of the sliding bar 10 is "I-beam"-shaped. In order to connect to the flat TV 40, the sliding bar 10 is configured with an installation hole 12, and the sliding bar 10 may connect to the flat TV 40 via the installation hole 12. The guiding-track assembly 30 includes a first guiding track 31 and a second guiding track 32, the first guiding track 31 may engage with the sliding bar 10 in a sliding manner, and the second guiding track 32 may engage with the fixed frame 20 in the sliding manner, wherein the sliding bar 10 may be installed in a horizontal direction, and the fixed frame 20 may be installed in a vertical direction, which is perpendicular to the horizontal direction. The structure of the guiding-track assembly 30 includes a bar-shaped body 33, side plate 34 integrally connected on two lateral sides of the bar-shaped body 33, and the first guiding track 31, wherein end portions of the first guiding track 31 extends toward each other. The first guiding track 31 inserts into the first groove 11 of the sliding bar 10 from two lateral sides of the sliding bar 10 such that the first guiding track 31 slide with respect to the sliding bar 10. In this way, the location of the flat TV 40 may be fixed after the sliding bar 10 has been moved to a fixed location. The relative locations of the sliding bar 10 and the first guiding track 31 may be fixed by a first positioning hole 35 configured on the side plate 34 located in an upper location. The first positioning hole 35 connects with threads of a positioning screw 36. The positioning screw 36 has been inserted into the first positioning hole 35 until an end portion of the positioning screw 36 contacts with the sliding bar 10. The second guiding track 32 of the guiding-track assembly 30 is integrally connected to a back side of the bar-shaped body 33. As shown, the structure of the second guiding track 32 is similar to that of the sliding bar 10, wherein two lateral sides of the second guiding track 32 are respectively configured with a second groove 37. The cross section of the second guiding track 32 is "I-beam"-shaped. A direction of the second groove 37 is perpendicular to the first groove 11 of the sliding bar 10 such that the flat TV 40 may be adjusted upward, downward, leftward, and rightward. The structure of the fixed frame 20 is similar to that of the first guiding track 31 of the guiding-track assembly 30. The fixed frame 20 includes a bar-shaped body 21, side plates 22 integrally connected with two lateral sides of the bar-shaped body 21, and a third guiding track 23 having end portions extend toward one another. The third guiding track 23 are inserted into the second groove 37 of the guiding-track assembly 30 from two lateral sides so as to slide relatively to the guiding-track assembly 30. Similarly, the flat TV 40 may be positioned after being adjusted upward or downward. In an example, a second positioning hole 24 may be configured on the side plates 22 of the fixed frame 20. The positioning hole 24 connects to threads of a positioning screw 25. In addition, a plurality of positioning grooves 38 may be configured on the second guiding track 32 of the guiding-track assembly 30, and the positioning grooves 38 correspond to the positioning holes 24 such that the positioning screw 25 may engage with the positioning grooves 38. The bar-shaped body 21 of the fixed frame 20 is also configured with a positioning hole 26 such that the fixed frame 20 may be fixed on the wall via a bolt.

The above are preferred embodiments of the claimed invention, and should not to be construed as limiting the claimed invention. All changes and combinations within the scope of the present embodiment are within the scope of the claimed invention. It can be understood that the sliding bar and the TV may be vertically connected, that is, the sliding bar and the TV may be connected by a direction perpendicular to the horizontal direction. At the same time, the fixing frame may be fixed on the wall along the horizontal direction. Also, the sliding directions of the first guiding track and the second guiding track may not be perpendicular to one other.

What is claimed is:

1. A wall-mounted device, comprising:
a sliding bar connecting to a display panel, a fixed frame being mounted on a wall, and a guiding-track assembly being configured between the sliding bar and the fixing frame, the guiding-track assembly comprises a first guiding track and a second guiding track, the first guiding track engages with the sliding bar in a sliding manner, and the second guiding track engages with the fixed frame in the sliding manner, wherein the sliding bar is installed in a pre-configured first direction, and the fixed frame is installed in a pre-configured second direction;
wherein two lateral sides of the sliding bar are configured with a first groove, and a cross section of the sliding bar is I-beam-shaped;
wherein the guiding-track assembly comprises a bar-shaped body, side plates integrally connecting to two lateral sides of the bar-shaped body, and the first guiding track, wherein end portions of the first guiding track extends toward one other, the first guiding track inserts into the first groove of the sliding bar from two lateral sides of the sliding bar so as to slide with respect to the sliding bar, and the second guiding track is integrally connected to a back side of the bar-shaped body.

2. The wall-mounted device as claimed in claim 1, wherein the first direction is a horizontal direction, and the second direction is a vertical direction perpendicular to the first direction.

3. The wall-mounted device as claimed in claim 1, wherein a first positioning hole is configured on one of the side plates located on an up portion of the guiding-track assembly, and the first positioning hole connects to threads of a positioning screw.

4. The wall-mounted device as claimed in claim 1, wherein two lateral sides of the sliding bar are configured with a second groove, a cross section of the second groove bar is "I"-shaped, and a direction of the second groove is perpendicular to the direction of the first groove of the sliding bar.

5. The wall-mounted device as claimed in claim 4, wherein a third guiding track having end portions extend toward one another, the third guiding track are inserted into the second groove of the guiding-track assembly from two lateral sides so as to slide relatively to the guiding-track assembly.

6. The wall-mounted device as claimed in claim 5, wherein a second positioning hole is configured on the side plates of the fixing frame, and the second positioning hole connects to threads of the positioning screw.

7. The wall-mounted device as claimed in claim 6, wherein a plurality of positioning grooves are configured on the second guiding track of the guiding-track assembly, and the positioning grooves correspond to the positioning holes.

* * * * *